United States Patent [19]
Kimura et al.

[11] Patent Number: 5,569,541
[45] Date of Patent: Oct. 29, 1996

[54] MODIFIED PLASTIC FILMS AND RECORDING MATERIALS UTILIZING THEM

[75] Inventors: Yoshihisa Kimura, Urawa; Toshinori Kido; Takashi Shimizu, both of Yono, all of Japan

[73] Assignee: Kimoto Co., Ltd., Japan

[21] Appl. No.: 364,303

[22] Filed: Dec. 27, 1994

[30] Foreign Application Priority Data

Dec. 28, 1993 [JP] Japan .................................. 5-337182
Dec. 28, 1993 [JP] Japan .................................. 5-337183

[51] Int. Cl.$^6$ .............................. B32B 27/08; C08J 7/18
[52] U.S. Cl. .......................... 428/520; 428/516; 428/412; 428/913; 428/922; 428/194; 428/199
[58] Field of Search ..................... 428/913, 520, 428/922, 516

[56] References Cited

U.S. PATENT DOCUMENTS 4,818,591 4/1989 Kitamura et al. .................... 428/913

FOREIGN PATENT DOCUMENTS 66635 1/1994 Japan .

OTHER PUBLICATIONS

Yamakawa, Surface Modification of Polyethylene by Radiation, 1976, pp. 3057–3072.

*Primary Examiner*—P. C. Sluby
*Attorney, Agent, or Firm*—Lorusso & Loud

[57] ABSTRACT

A modified plastic film in the form of a plastic film provided on both its surfaces with ionizing radiation cured resin layers having a hardness equal to or harder than a pencil hardness of H and a recording material formed with the modified plastic film as a substrate, wherein rippling during storage in high humidity or caused by heat is markedly reduced.

8 Claims, 8 Drawing Sheets

MODIFIED PLASTIC FILMS AND RECORDING MATERIALS UTILIZING THEM

BACKGROUND OF THE INVENTION

1. Field of the Invention

The present invention relates to a modified plastic film and, particularly, it relates to a modified plastic film wherein the waving of the whole film caused by heat and waving of film edges caused by moisture are reduced. The present invention further relates to recording materials utilizing such a modified plastic film and, particularly, it relates to recording materials wherein the waving of the whole recording sheet caused by heat and the waving of edges of the recording sheet caused by moisture are reduced when it is used for copying in a plain paper copier (PPC), laser beam printer or the like.

2. Prior Art

Since plastic films are transparent, excellent in chemical resistance, easy to form, inexpensive and sufficiently strong, they have been used as supports in various industrial materials, building materials, materials for decoration, materials for home use and the like, such as second original films, graphic arts films, films for overhead projection, video tapes, audio tapes, floppy discs and photographic films. Such plastic films include polyester films, polycarbonate films, acetylcellulose films, polyvinyl chloride films and the like.

Plastic films used as supports in various recording sheets include plastic films of which both surfaces are laminated to thermosetting recording layers formed from acrylic polyols, isocyanates and, optionally, matting agents, in order to improve solvent resistance of the paper sheets which is required for retouch or correction by various writing materials applied to the sheets.

However, plastic materials generally have a relatively low softening temperature. For example, polyester, which is the most commercially popular plastic material, has a glass transition temperature of about 70° C. and, if a plastic film composed of it is employed for a use where it is heated to a temperature above its glass transition temperature, the film would be softened and hence deformed. Examples of such a use include use as recording sheets such as those for second original films for PPC and films for overhead projectors. When plastic films are used as printing sheets for PPC and the like, the films are deformed due to the temperature employed to fix the toner and in printing they are given a very wavy form as a whole. Such phenomena are particularly remarkable in machines using a high temperature for fixing such as laser beam printers and machines using a long fixing time and, in such machines, the sheets would cause jamming in the sheet transfer route.

Therefore, plastic films can be used for such purposes only in machines using a low fixing temperature and a short fixing time. Laser beam printers and the like, which use a high fixing temperature, cannot use plastic films, but only paper sheets.

Various plastic films are usually cut into sheets and stacked or rolled for their storage. The films stored in the form of stacked sheets or rolled film absorb moisture from their four side edges in the case of stacked sheets and from both ends of the roll in the case of rolled sheets and they exhibit wavy edges (referred as "petal phenomenon" hereinafter) when they are spread or unrolled. The petal phenomenon causes various problems. For example, in the field of photograving, it causes poor contact of photosensitive films upon contact exposure, poor cutting lines for masking films in automatic drawing machines, distortion of cut lines, poor positioning of the sheets and the like. Also in the field of design drafting, such plastic films have various problems such as walk-off, distortion of lines and poor positioning of sheets when drawing with pen plotters on tracing films, sheet jamming when copying second originals by PPC, and poor contact of second originals with photosensitive materials upon contact exposure.

As a method for preventing the petal phenomenon, humidity controlling paper sheets have been interleaved between adjacent films to reduce the influence of outside air humidity. Therefore, the additional process step for interleaving the humidity controlling paper sheets is inevitable and the paper sheets must be pealed off and discarded upon use of the films. These steps make the process troublesome and may cause problems from the viewpoint of resource-saving.

The object of the present invention is to solve the above problems and to provide a modified plastic film less susceptible to waving of the whole film caused by heat and edge waving caused by moisture. A further object of the present invention is to provide a recording material which retains a flat form and does not cause jamming even when used in printers utilizing a high toner fixing temperature such as laser beam printers and in which the petal phenomenon, caused by moisture absorption upon storage, is prevented.

SUMMARY OF THE INVENTION

To achieve the above objects, the modified plastic film of the present invention is provided on both its surfaces with layers of ionizing radiation cured resin having a hardness equal to or harder than a pencil hardness of H. The layers of ionizing radiation cured resin are preferably formed from coating compositions containing photopolymerizable prepolymers, photopolymerizable monomers and photopolymerization initiators.

The recording material of the present invention comprises a plastic film with both of its opposing surfaces covered with a layer of ionizing radiation cured resin having a hardness equal to or harder than a pencil hardness of H and a toner receptive layer covering at least one of the layers of ionizing radiation cured resin.

In the recording material of the present invention, the layers of ionizing radiation cured resin are also preferably formed from a coating composition containing photopolymerizable prepolymers, photopolymerizable monomers and photopolymerization initiators and, optionally, matting agents. The toner receptive layer preferably comprises a resin having a glass transition temperature of from 45° to 100° C. and it may contain an antistatic agent.

DETAILED DESCRIPTION OF THE INVENTION

Figure 1:
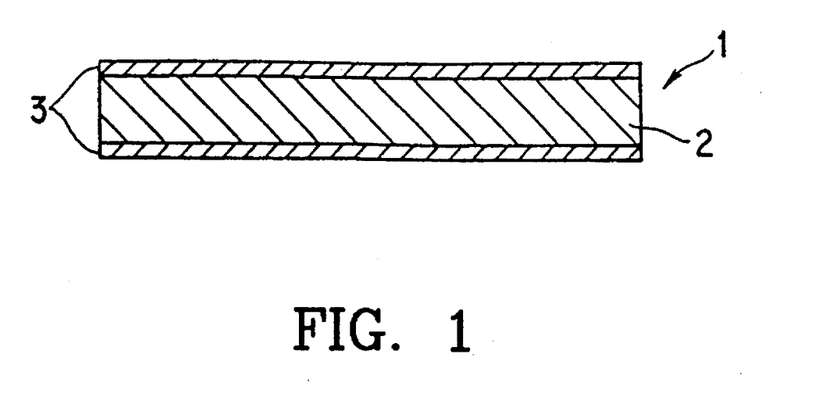
FIG. 1 is a cross-sectional view of an embodiment of a modified plastic film according to the present invention wherein the modified plastic film 1 comprises a plastic film 2 and ionizing radiation cured resin layers 3.

As shown in FIG. 1, the modified structure wherein a plastic film 2 is laminated on both its surfaces to ionizing radiation cured resin layers 3.

For the plastic film 2, polyethylene terephthalates, polybutylene terephthalates, polycarbonates, polypropylenes, polyethylenes, acetylcelluloses, vinyl chloride resins, fluorocarbon resins and the like may be used. Those having been subjected to a stretching process, in particular biaxial stretching, are preferred since they have improved mechanical strength and dimensional stability.

The thickness of the plastic film may be suitably selected depending on the material used and it generally ranges from 4 to 250 μm.

The ionizing radiation cured resin layers 3 provided on both surfaces of the support hold the plastic film therebetween and fix it to prevent deformation of the plastic film by heat and moisture. The resin layers are formed from a paint containing resins curable by irradiation with an electron beam or ultraviolet (UV) rays.

The ionizing radiation curable paint contains photopolymerizable prepolymers, photopolymerizable monomers and photopolymerization initiators and, optionally, additives such as sensitizers, pigments, fillers, non-reactive resins, leveling agents and solvents.

Structure, functionality and molecular weight of the photopolymerizable prepolymers influence the curing of the ionizing radiation curable paint, and they determine the properties of the ionizing radiation cured layer such as adhesive property, hardness and anti-crack property. Photopolymerizable prepolymers have functional groups introduced into their skeletons, which may cause radical polymerization and/or cation polymerization when radiated by ionizing radiation. Those which undergo radical polymerization are particularly preferred since they show a higher curing rate and hence provide a high degree of freedom with respect to the resin design.

As the radical polymerizable prepolymers, acrylic prepolymers having acryloyl groups are particularly preferred and they may have two or more acryloyl groups per molecule and can form three dimensional reticular structures. As the acrylic prepolymers, urethane acrylates, epoxyacrylates, melamine acrylates, polyester acrylates and the like may be used.

The photopolymerizable monomers are used to improve workability of the photopolymerizable prepolymer, which has high viscosity, by diluting it to a lower viscosity, and to impart coating strength as crosslinking agents. As the photopolymerizable monomers, one or more of monofunctional acrylic monomers such as 2-ethylhexyl acrylate, 2-hydroxyethyl acrylate, 2-hydroxypropyl acrylate and butoxyethyl acrylate, bifunctional acrylic monomers such as 1,6-hexanediol acrylate, neopentyl glycol diacrylate, diethylene glycol diacrylate, polyethylene glycol diacrylate and hydroxypivalate neopentyl glycol acrylate, polyfunctional acrylic monomers such as dipentaerythritol hexaacrylate, trimethylpropanetriacrylate and pentaerythritol triacrylate and the like may be used.

As the amount of the photopolymerizable monomers added to the paint is increased, the coating becomes harder. Therefore, its mixing ratio should be suitably selected so that the desired hardness or desired flexibility can be obtained. When the film is to be used as a support for another material, its hardness may be adjusted in accordance with the properties desired for the specific intended use of the film. For example, for a use where the films are bended or folded, their hardness may be adjusted by mixing non-reactive resins, excellent in flexibility, to obtain the desired flexibility. As such non-reactive resins, thermosetting or thermoplastic acrylic resins, epoxy resins and the like may be used.

The photopolymerization initiators have a catalytic function and are added to initiate the polymerization reactions of the acryloyl groups upon exposure to ionizing radiation for a short period and to accelerate the reaction. The photopolymerization initiators are particularly required when the curing is performed by UV radiation, while sometimes they are not needed when electron radiation with high energy is used. The photopolymerization initiators include those causing radical polymerization by cleavage, those causing radical polymerization by hydrogen atoms and those causing cation polymerization by generating ions. Any such photopolymerization initiators can be used for the present invention and they include photopolymerization initiators for radical polymerization such as benzoin ethers, ketals, acetophenones, thioxanthones and the like and photopolymerization initiators for cation polymerization such as diazonium salts, diaryliodonium salts, triarylsulfonium salts, triarylpyrylium salts, benzylpyridinium thiocyanate, dialkylphenacylsulfonium salts, dialkylhydroxyphenylsulfonium salts, dialkylhydroxyphenylphosphonium salts and the like and complex types. One or more of such photopolymerization initiators can be used. The photopolymerization initiators are mixed in the amount of 2 to 10% by weight, preferably 3 to 6% by weight based on the solid matter of the resin.

Further, the ionizing radiation curable paint may contain additives such as sensitizers, pigments, fillers, non-reactive resins and leveling agents. The compositions may be diluted with compatible solvents to form paints.

In order to cure the ionizing radiation curable paint, it is radiated with an electron beam or UV rays. When the radiation is carried out with an electron beam, an electron beam with an energy of accelerating voltage of not more than 1000 keV, preferably 100 to 300 keV, and a wavelength of not more than 100 nm may be generated by using an electron radiation accelerator of the scanning type or the curtain type. When the radiation is carried out with UV rays, UV rays with a wavelength of from 100 to 400 nm, preferably 200 to 400 nm, and an energy of 71 to 285 kcal/mol may be obtained using ultra high pressure mercury lamps, high pressure mercury lamps, low pressure mercury lamps, carbon arc, xenone arc, metal halide lamps and the like.

The ionizing radiation cured resin layer having such a composition as described above may be formed by coating the ionizing radiation curable paint onto a plastic film and irradiating it with an electron beam or UV radiation. The ionizing radiation curable paint may be coated on the plastic film by any usual coating method such as Mayer bar coating, blade coating, gravure coating, spin coating or spray coating.

When the ionizing radiation curable paint coated on a plastic film is cured by irradiating it with an electron beam or UV radiation, the curing may be greatly influenced by the presence of oxygen and the thickness of the coating. Radicals generated by the radiation of ionizing radiation capture oxygen and hence the presence of oxygen inhibits the curing. Therefore, the thinner the thickness of the coating, the larger the ratio of the surface area relative to the volume of the coating becomes and the curing becomes more likely to be inhibited by the oxygen in air. On the other hand, when the thickness of the coating is excessive, it becomes difficult for the ionizing radiation to permeate into the inside of the coating. As a result, curing of the deeper portion becomes insufficient, while the surface portion may be cured, and poor adhesion between the layer of ionizing radiation cured resin and the polyester film is caused due to the presence of the uncured interfacial portions. In order to avoid such inhibition of curing or an uncured portion, the radiation by electron beam, in particular, can be performed in the presence of an inert gas such as $N_2$. Further, by adjusting the thickness of the coating, employing photopolymerizable prepolymers and photopolymerizable monomers of high curing rate and increasing the amount of the photopolymerization initiator added, the inhibition of curing may be prevented.

The hardness of the ionizing radiation cured resin layer should be equal to or harder than a pencil hardness of H, preferably 2 H, determined according to JIS-K5400. When it is softer than H, deformation of the plastic films by humidity or heat cannot be effectively prevented.

The thickness of the ionizing radiation cured resin layer may vary depending on the material and thickness of the plastic film used. That is, if a plastic film having a lower glass transition temperature or a greater thickness is used, the ionizing radiation cured resin layer should have a relatively greater thickness. However, even though a thick plastic film is used, if it is used for a purpose where a relatively short heating time is used, heat is not easily transmitted to the inside of the film and hence it is not likely to be deformed. Accordingly, in such a case, a relatively lower thickness of the layer may be used. As described above, the thickness of the ionizing radiation cured layer cannot be definitely defined, but it may be 1 to 30 µm, preferably 3 to 10 µm, when on a polyester film used as a printing sheet for a laser beam printer utilizing a temperature of 200° C. for thermal fixing.

Such a modified plastic film held between the ionizing radiation cured layers shows substantially no waving phenomenon even if it is used for a copying machine utilizing a temperature of more than 200° C. for thermal fixing. Further, the petal phenomena are markedly reduced when it is left in high humidity in a stacked or rolled form.

It is considered that the waving phenomenon caused by heat is prevented by the high glass transition temperature and high hardness of the ionizing radiation cured resin layer. That is, since the ionizing radiation cured resin layers are provided on both the surfaces of the plastic film, the plastic film cannot be deformed even though it is softened by heat. Further, the resistance of the structure to heat transmission to the plastic film is believed to contribute to prevention of the waving phenomena.

In addition, the petal phenomena caused by humidity are also reduced and this is considered to be due to the fact that, since the plastic film is held between the ionizing radiation cured resin layers, the plastic film cannot be deformed even though the edges of the film absorb moisture.

By using the modified plastic films as base materials and providing additional various layers on top of the ionizing radiation cured resin layers, materials having various characteristics, but all resistant to waving caused by heat and waving of their edges caused by moisture, can be prepared.

For example, second original films for PPC, films for overhead projectors and the like may be prepared by forming toner receptive layers on top of the ionizing radiation cured resin layers, and used as printing sheets for PPC, laser beam printers and the like, with waving of the sheets clearly reduced.

Further, tracing films or films for electrographic recording may be prepared by further application of writing layers or electrographic recording layers. When they are used in pen plotters or electrographic plotters, distortion of lines, poor positioning of paper sheets, jamming of paper sheets and like problems can be avoided since the petal phenomenon is reduced. In addition, when drawings prepared as described above are used as second originals and printed onto photosensitive materials, they do not have poor contact.

Further, masking films can be prepared by providing peelable masking layers on the modified plastic film and may be used in automatic drawing machines without poor cutting, distortion of cut lines, poor positioning of the films and the like. Good contact is also obtained when printing onto photosensitive materials.

Furthermore, by providing photosensitive layers, the modified plastic films can be used as photosensitive films with good contact upon printing and retention of flatness upon developing.

By providing magnetic layers, they may be used as video tapes, audio tapes, floppy discs, pre-paid cards and the like and they may be used for any purpose requiring flatness of the plastic films.

The recording material of the present invention will now be explained.

Figure 6:
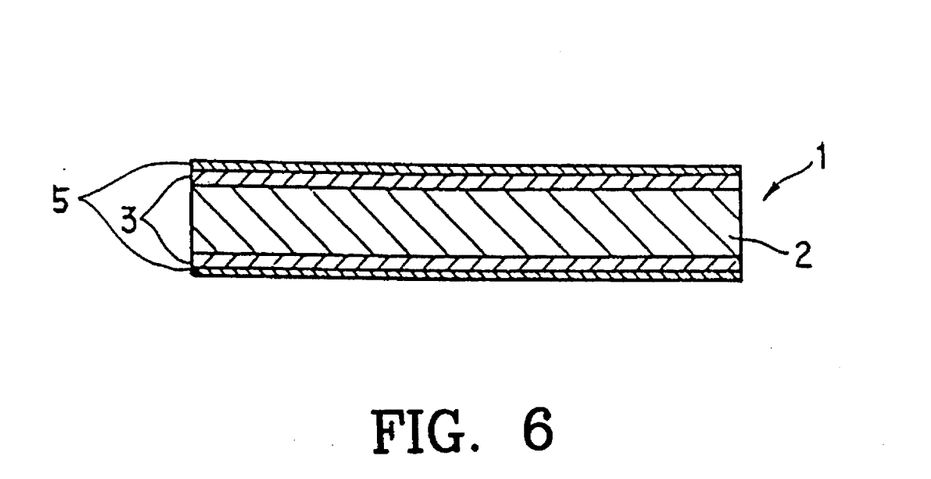
FIG. 6 is a cross-sectional view of an embodiment of a recording sheet according to the present invention wherein the recording sheet 1 comprises a plastic film 2, ionizing radiation cured resin layers 3 and a toner receptive layer 5.

The recording material of the present invention comprises the modified plastic film of the present invention described above wherein at least one of its surfaces is provided with a toner receptive layer. Specifically, as shown in FIG. 6, the recording material 10 comprises a plastic film 2, ionizing radiation cured resin layers 3 provided on both of the surfaces of the plastic film and a toner receptive layer 5 provided on the ionizing radiation cured resin layer 3.

Though the plastic film 2 and the ionizing radiation cured resin layer may be the same as those used for the modified plastic films 1 described above, when the modified plastic films are used for recording material, the ionizing radiation curable paint may also contain a matting agent in order to better receive writing. As the matting agent, silica, titanium oxide, zinc oxide, calcium carbonate, barium sulfate, magnesium oxide and the like may be used. The matting agent can be used in an amount of 10 to 200% by weight, preferably, 20 to 100% by weight based on the solid matter of the resin.

The toner receptive layer 5, which is provided on the ionizing radiation cured resin layers 3, is provided in order to improve the fixing of toner used in PPC, laser beam printers and the like and may be provided on the surface(s) of both or one of the ionizing radiation cured resin layers 3.

Preferably, the toner receptive layers comprise resins having a glass transition temperature of 45° to 100° C. A glass transition temperature not less than 45° C. is preferred to prevent blocking when a large number of recording sheets are stacked, and a glass transition temperature not more than 100° C. is preferred to improve adhesion of toner. However, if used in a machine using a high fixing temperature, a resin having a glass transition temperature of more than 100° C. may be also used. As the resins, there can be mentioned homopolymers and copolymers of acrylic resins, polyethylene, polystyrene, poly(vinyl chloride), polyacrylonitrile, poly(vinyl butyral), poly(vinyl acetate), polyamide, polyester and the like, and they can be used alone or in any combination thereof.

The toner receptive layer may incorporate various additives, if necessary. A particularly preferred additive is an antistatic agent. By adding antistatic agents, transfer, adhesion of toner and handling properties of the recording material can be improved.

The toner receptive layer should have a thickness of not less than 0.1 μm.

Further, if good adhesion between the toner receptive layer and the ionizing radiation cured resin layer cannot be obtained, the adhesion may be improved by subjecting the ionizing radiation cured resin layer to a surface treatment or providing an anchor coating layer.

Further, desirable properties for the toner receptive layer can be obtained by selection of additives and, in addition, any additional layers having desired properties may be provided over the toner receptive layer, depending on the specific intended use of the recording material.

The recording material having the structure described above shows substantially no rippling (waving) even when used for copying machines utilizing a fixing temperature of not less than 200° C. Further, when stacked sheets or rolls of the recording material are left in high humidity, the petal phenomena are markedly reduced.

The above-described embodiments are exemplary and the present invention is not limited thereto. For instance, an adhesion layer may be interposed between the plastic film and the ionizing radiation cured resin layer and the plastic film may be subjected to a treatment for enhancement of adhesion.

EXAMPLES

The present invention will be further explained by the following working examples.

EXAMPLE 1

An ionizing radiation curable paint having the following composition was prepared and coated on both surfaces of a polyester film having a thickness of 50 μm by a Mayer bar. The coated resin layers were irradiated with UV rays for 1 to 2 seconds by means of a high pressure mercury lamp to provide ionizing radiation cured resin layers having a thickness of 3.5 μm and thereby form a modified plastic film.

| Composition of the Ionizing Radiation Curable Resin: (solid matter: 25% by weight) | |
|---|---|
| UV curable acrylic resin (UniDic 17-806: Dainippon Ink & Chemicals Inc.) | 13.0 parts by weight |
| Methyl ethyl ketone | 12.0 parts by weight |
| Toluene | 12.0 parts by weight |
| Ethylcellosolve | 4.7 parts by weight |
| Photopolymerization initiator (IrgCure 651: Ciba Geigy Inc.) | 0.3 parts by weight |

The thus obtained modified plastic film was tested to evaluate its petal phenomena and waving caused by heat.

(1) Test for evaluating petal phenomena

Figure 2A:
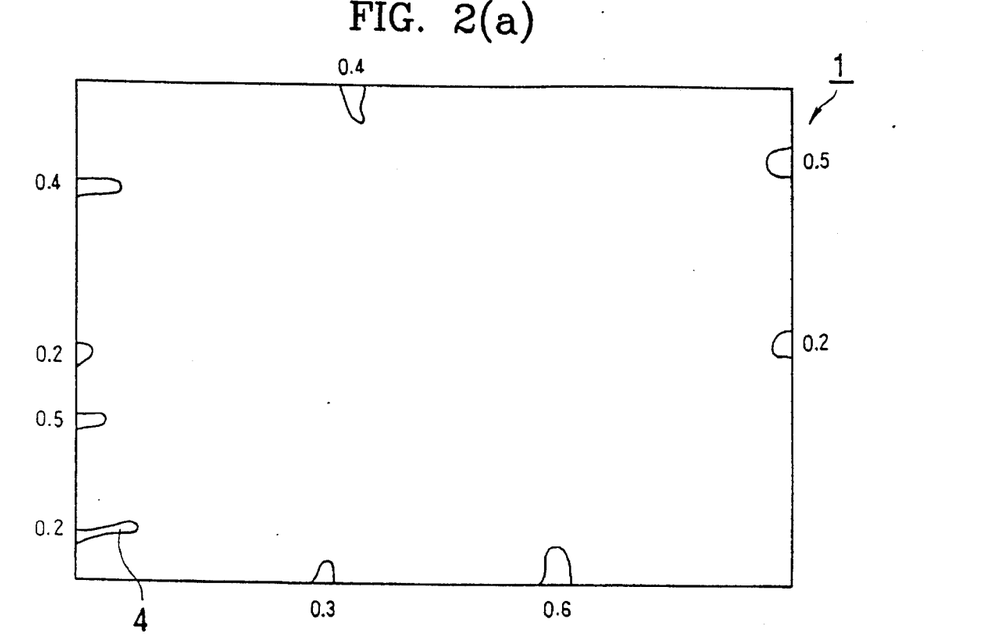
FIGS. 2(a) and 2(b) are drawings representing moisture characteristics of the modified plastic film of FIG. 1 wherein the numbers adjacent to petals 4 indicate heights of the petals.
Figure 2B:
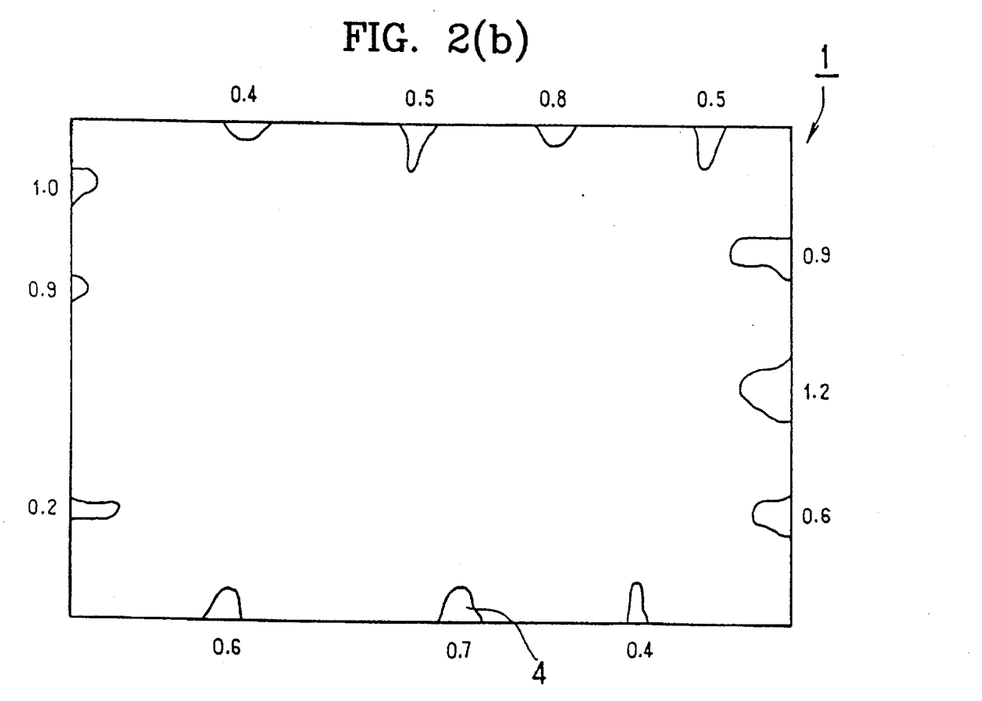

The obtained modified plastic film was cut into sheets having a size of 594×841 mm. The sheets (100 sheets) were stacked and left at a temperature of 36.5° C. and a relative humidity of not less than 90% for 24 hours. Then, the third sheet and the 50th sheet from the top were examined for occurrences of petal phenomena. The petals 4 of the third film sheet 1 and the 50th film sheet 1 were as shown in FIGS. 2 (a) and (b), respectively. The numbers in the figures indicate the heights of the petals.

Figure 3A:
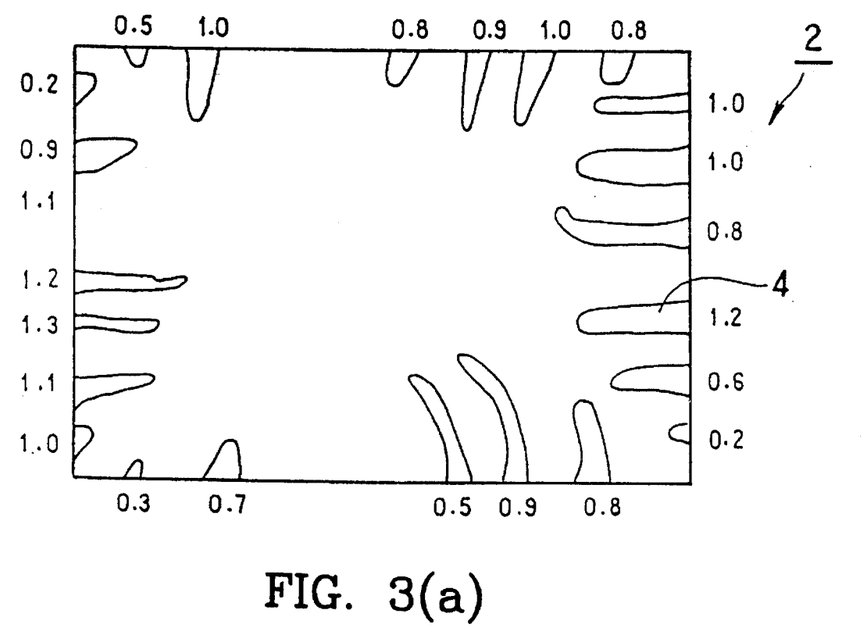
FIGS. 3(a) and 3(b) are drawings representing moisture characteristics of a conventional plastic film 2 wherein the numbers adjacent to petals 4 indicate heights of the petals.
Figure 3B:
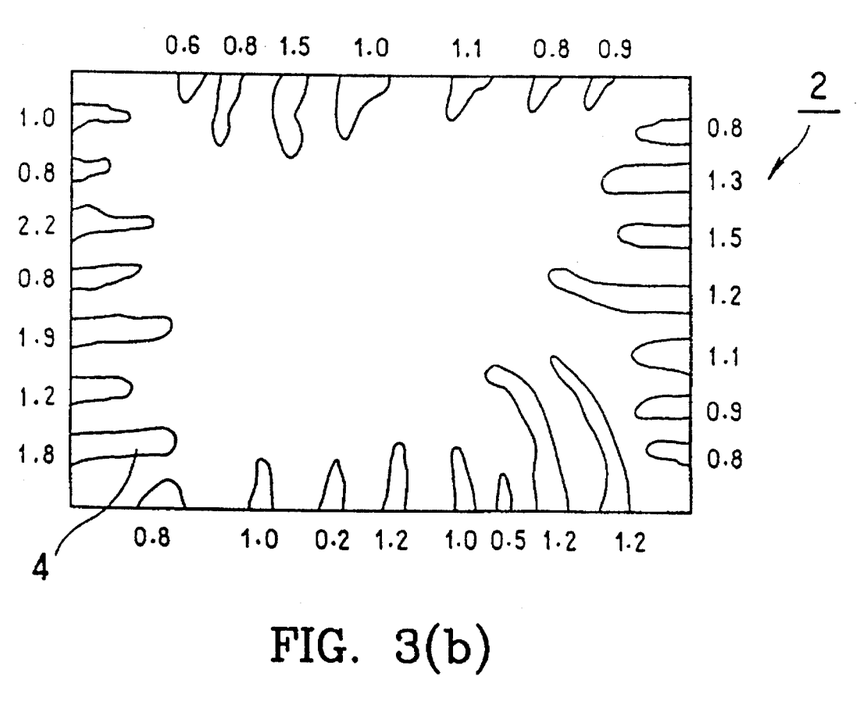

As a comparison (Comparative Example 1), a polyester film having a thickness of 50 μm was cut and stacked as described above and left under the same conditions as described above. Then, occurrences of the petal phenomena in the films were evaluated in the same manner as described above. The petals 4 of the third film sheet 2 and the 50th film sheet 2 were as shown in FIGS. 3 (a) and (b). The numbers in the figures indicate the heights of the petals.

As clearly seen from the above results, few petal phenomena were observed in the modified plastic film of the present invention and was observed that it maintained flatness under the high humidity condition.

(2) Test for evaluating waving caused by high temperature

Figure 4:
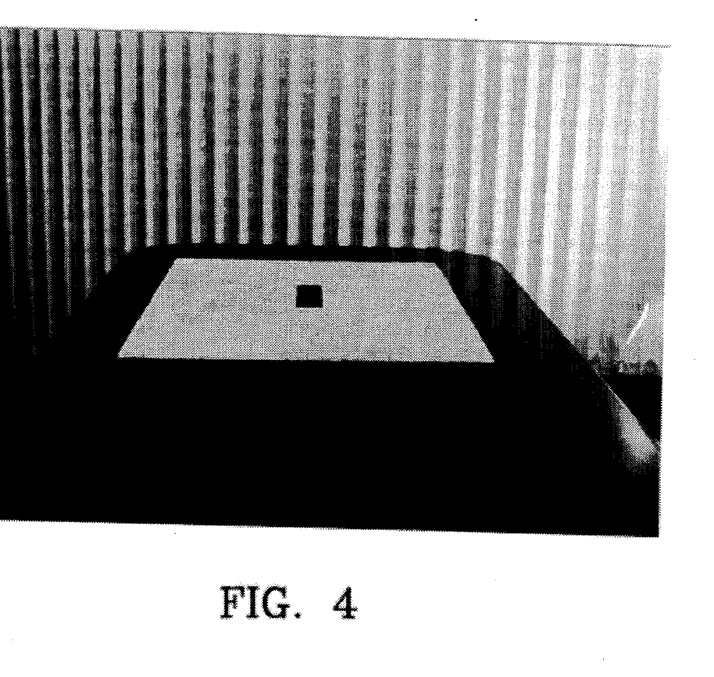
FIG. 4 is a photograph of a modified plastic film of the present invention after ejection from a copier.

By using the obtained modified plastic film, a printing process was carried out in a copier for large size drawings (Xerox 5080: Fuji Xerox Co., Ltd) at a fixing temperature of film mode 4 (about 250° C.). As shown in FIG. 4, the modified plastic film after the printing showed no waving and was like the film before the printing.

Figure 5:
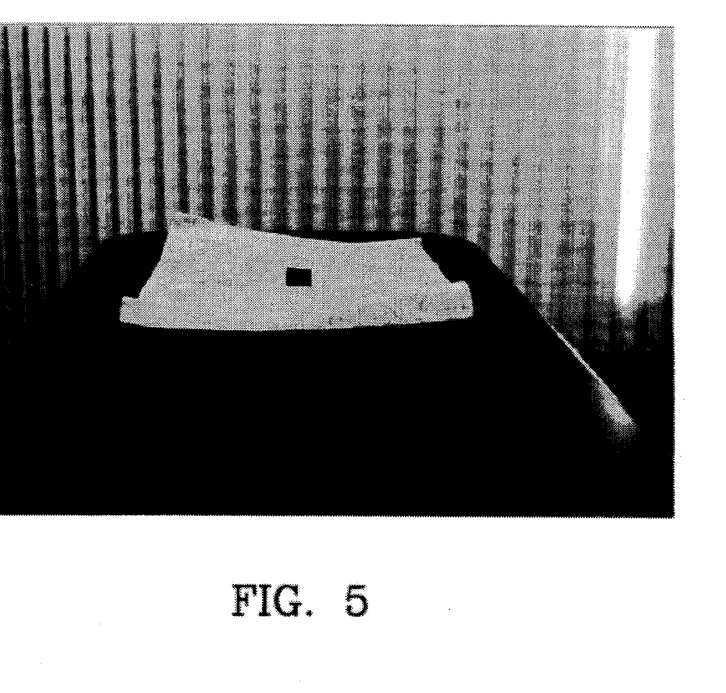
FIG. 5 is a photograph of a conventional plastic film after ejection from a copier wherein petals 4 are observed.

As a comparison, a printing process was carried out in the same manner in a copier for large size drawings as described above excepting that a polyester film of a thickness of 50 μm was used. During the printing process, the polyester film became jammed on its transfer route through the copier downstream of the fixing area. When a carrier paper sheet (5 cm) was attached to the front end of the polyester film, the printing process could be carried out without causing jamming. However, as shown in FIG. 5, a large number of waves having heights of more than 10 mm resulted and it was not practically acceptable.

As clearly seen from the above results, no heat-dependent waving was observed and the flatness was remarkably improved in the modified plastic film of the present invention.

EXAMPLE 2

An ionizing radiation curable paint having the following composition was prepared and coated on both surfaces of a polyester film having a thickness of 50 μm by a Mayer bar. The coated resin layers were irradiated with UV for 1 to 2 seconds by means of a high pressure mercury lamp to provide ionizing radiation cured resin layers having a thickness of 7.0 µm.

| Composition of Ionizing Radiation Curable Resin: (solid matter: 23% by weight) | |
| --- | --- |
| UV curable acrylic resin (UniDic 17-806: Dainippon Ink & Chemicals Inc.) | 13.0 parts by weight |
| Photopolymerization initiator (IrgCure 651: Ciba Geigy AG) | 0.3 parts by weight |
| Matting agent (silica) (Sylysia 740: Fuji Silysia Chemical Co., Ltd.) | 4.5 parts by weight |
| Matting agent (silica) (Aerosil R-974: Nippon Aerosil Co., Ltd.) | 0.8 parts by weight |
| Methyl ethyl ketone | 18.0 parts by weight |
| Toluene | 23.0 parts by weight |
| Butyl acetate | 10.0 parts by weight |

A paint having the following composition was applied to both the surfaces of the obtained ionizing radiation cured resin layer by a Mayer bar and dried to form toner receptive layers having a thickness of 1 µm, whereby a recording material was obtained.

| Composition of Paint: | |
| --- | --- |
| Acrylic resin emulsion (Johncryl 780: Johnson Polymer Co., Ltd) | 2.0 parts by weight |
| Acrylic resin emulsion (Nicasol RX301: Nippon Carbide Co., Ltd) | 8.0 parts by weight |
| Antistatic styrene resin (VERSA TL-125: Kanebo NSC Co., Ltd.) | 1.0 parts by weight |
| Water Meta-modified alcohol | 34.0 parts by weight |

Comparative Example 2

A thermosetting resin paint having the same composition as the ionizing radiation curable resin used in the above example, excepting that it contained the following components instead of the UV curable acrylic resin and the photopolymerization initiator, was prepared and coated on a polyester film having a thickness of 50 µm by a Mayer bar. The coated resin layer was subjected to a heat treatment at 150° C. for 1 minute and 30 seconds to provide thermosetting resin layers having a thickness of 7.0 µm.

| Acrylic Polyol (AcryDic A-814: Dainippon Ink & Chemicals Inc.) | 17.5 parts by weight |
| --- | --- |
| Isocyanate curing agent (Takenate D-11ON: Takeda Chemical Industries, Ltd.) | 2.6 parts by weight |

The same toner receptive layers were formed on the thus obtained thermosetting resin layers to obtain a recording material.

The two kinds of recording materials obtained in Example 2 and Comparative Example 2 were tested to evaluate occurrence of the petal phenomena and occurrence of waving caused by high temperature.

(1) Test for evaluating petal phenomena

Figure 7A:
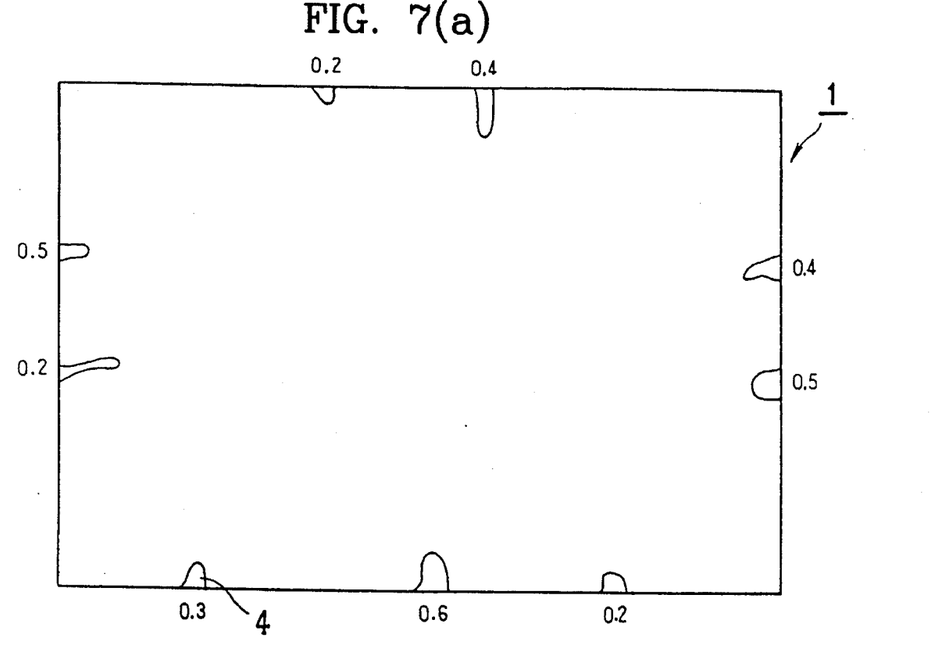
FIGS. 7(a) and 7(b) are drawings representing moisture characteristics of embodiments of the recording sheet of the present invention wherein the numbers adjacent to petals 4 indicate heights of the petals.
Figure 7B:
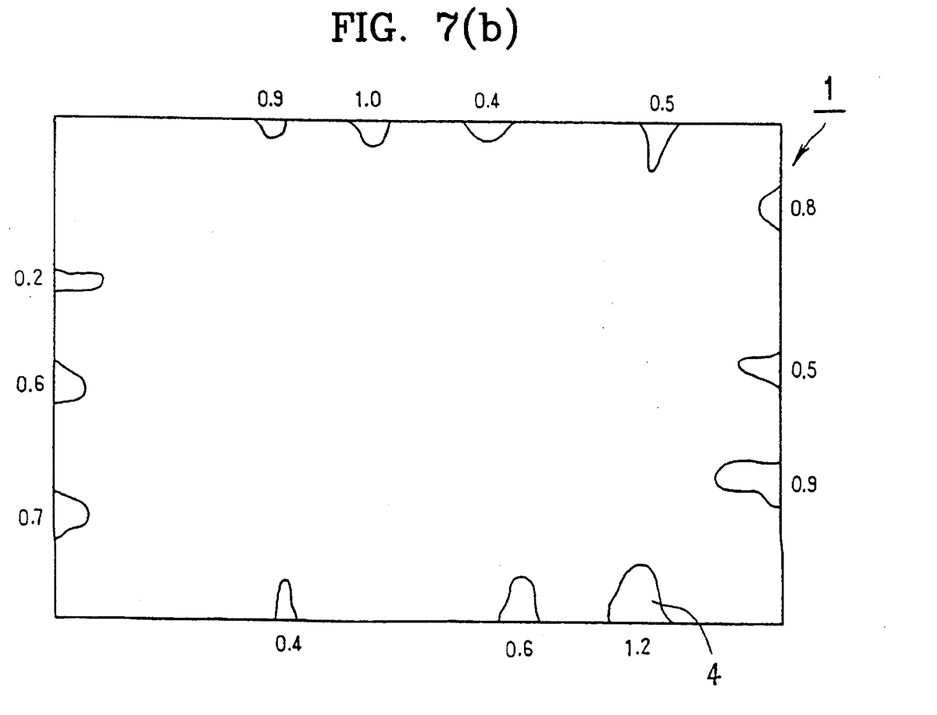

The recording material obtained in Example 2 was cut into sheets having a size of 594×841 mm. The sheets (100 sheets) were stacked and left at a temperature of 36.5° C. and a relative humidity of not less than 90% for 24 hours. Then, the third sheet and the 50th sheet from the top were examined for occurrences of petal phenomena. The petals 4 of the third recording sheet 10 and the 50th recording sheet 10 were as shown in FIGS. 7 (a) and (b), respectively. The numbers in the figures indicate the heights of the petals.

Figure 8A:
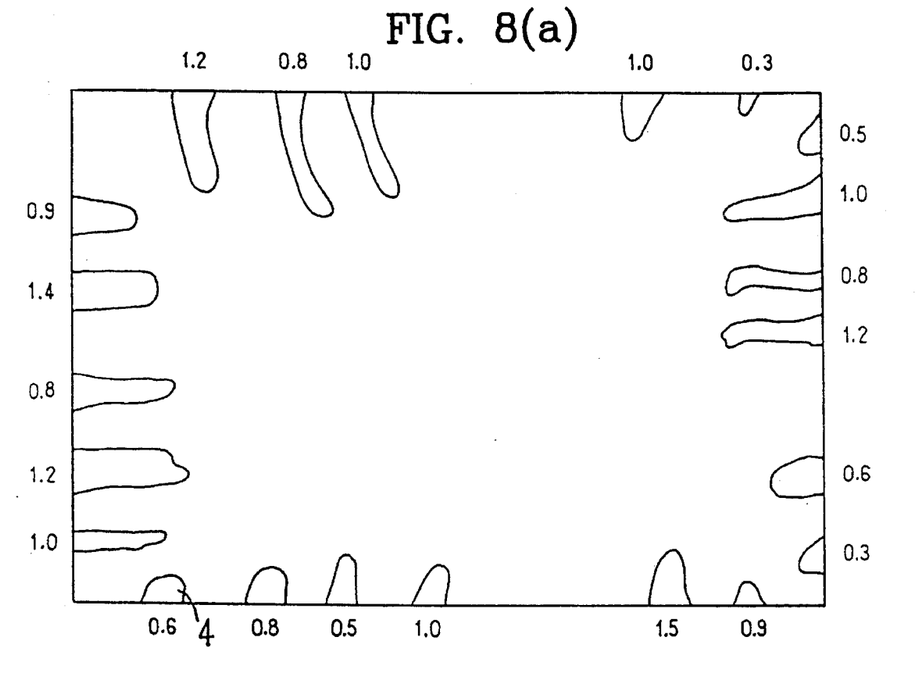
FIGS. 8(a) and 8(b) are drawings representing moisture characteristics of a conventional recording material sheet wherein the numbers adjacent to petals 4 indicate heights of the petals.
Figure 8B:
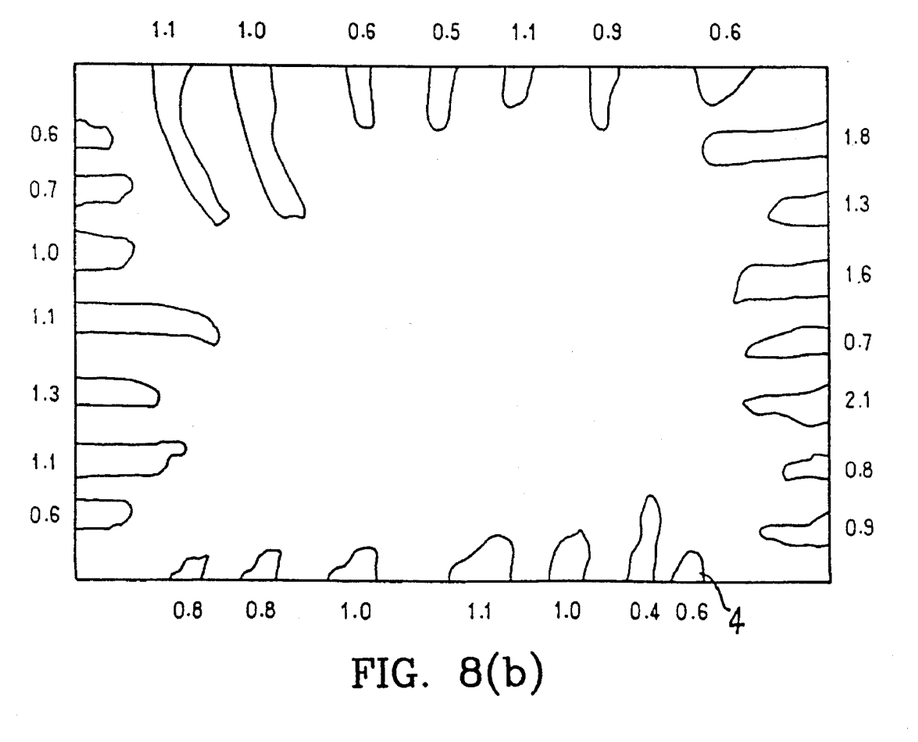

Then, the recording material utilizing thermosetting resin which was obtained in Comparative Example 2 was cut and stacked as described above and left under the same conditions as described above. Then, occurrences of the petal phenomena in the sheet were evaluated in the same manner as described above. The petals 4 of the third film sheet 2 and the 50th film sheet 2 were as shown in FIGS. 8 (a) and (b), respectively. The numbers in the figures indicate the heights of the petals.

As clearly seen from the above results, few petal phenomena were observed in the recording material of the present invention, and it was found to maintain flatness in high humidity.

(2) Test for evaluating waving caused by high temperature

Figure 9:
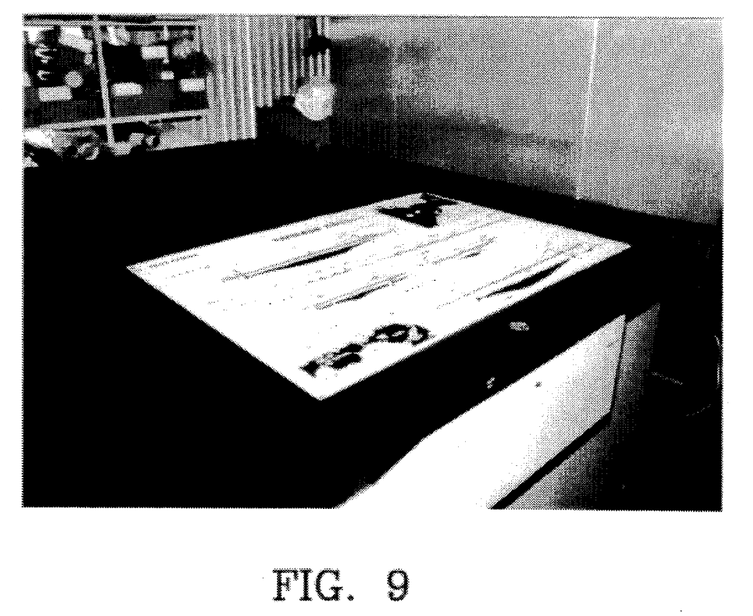
FIG. 9 is a photograph of an embodiment of a recording sheet of the present invention after ejection from a copier.
Figure 10:
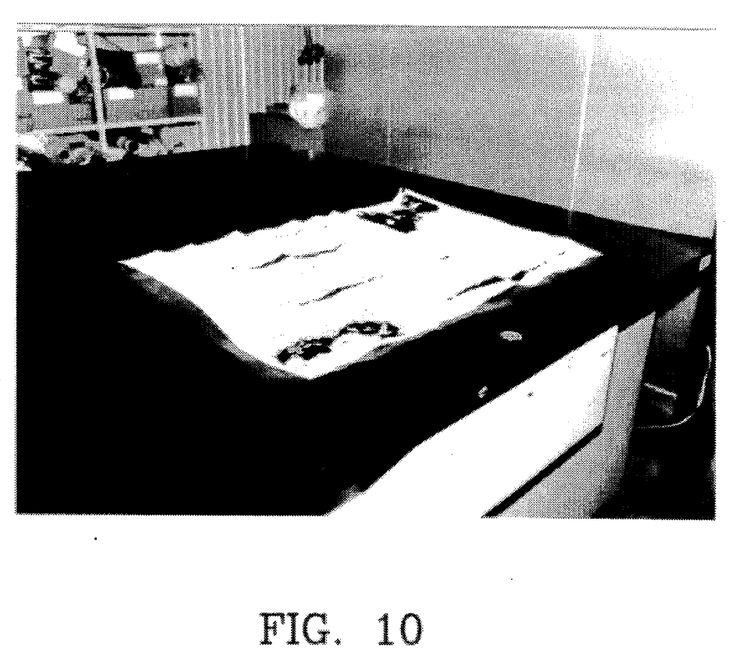
FIG. 10 is a photograph of a conventional recording sheet after copying.

By using the recording material obtained in Example 2, a printing process was carried out in a copier for large size drawings (Xerox 5080: Fuji Xerox Co., Ltd) at a fixing temperature of film mode 4 (about 250° C.). As shown in FIG. 9, the recording material of Example 2 after the printing showed no waving and was like the film before the printing in this regard. Further, the fixed toner was not removed when the printed surface was rubbed.

By using the recording material (thermosetting resin) of Comparative Example 2, a printing process was carried out under the same conditions as described above in the copier for large size drawings. During the printing process, the recording material became jammed in the transfer route of the copier downstream of the fixing area. When a carrier paper sheet (5 cm) was attached to the front end of the recording sheet, the printing process could be carried out without causing jamming. However, as shown in FIG. 9, a large number of waves having heights of more than 10 mm were formed and it was not practically acceptable.

As clearly seen from the above results, no temperature dependent waving was observed and the flatness was remarkably improved in the recording sheet of the present invention.

As seen from the above explanations, because of the presence of the ionizing radiation cured layers on both surfaces of the plastic film, rippling of the film is not seen in the modified plastic films of the present invention even when heated to a temperature more than 200° C., occurrence of the petal phenomenon is prevented and flatness is maintained when the films in the form of stacked sheets or rolls are left under circumstances of high temperature and high humidity. Therefore, by providing various layers on the ionizing radiation cured layers, it is possible to use the plastic films as supports for a variety of materials.

Further, in the recording material of the present invention, because the toner receptive layer is provided on the ionizing radiation cured resin layer of the modified plastic film, good toner fixing can be obtained.

What is claimed is:

1. A modified plastic film comprising a plastic film provided on both of its surfaces with cured resin layers having a hardness equal to or harder than a pencil hardness of H, the cured resin layers being formed by coating an ionizing radiation curable mixture of a photopolymerizable prepolymer, a photopolymerizable monomer and a photopolymerization initiator on the plastic film and irradiating the mixture.

2. The modified plastic film of claim 1 wherein said cured resin layers are formed by free radical polymerization.

3. The modified plastic film of claim 1 wherein said photopolymerization initiator is 2–10% by weight of solid matter in said curable mixture.

4. A recording material comprising;

a plastic film provided on both of its surfaces with cured resin layers having a hardness equal to or harder than a pencil hardness of H, the cured resin layers being formed by coating an ionizing radiation curable mixture of a photopolymerizable prepolymer, a photopolymerizable monomer and a photopolymerization initiator on the plastic film and irradiating the mixture; and a toner receptive layer comprising a resin having a glass transition temperature of from 45° to 100° C. provided on at least one of the cured resin layers.

5. The recording material of claim 4 wherein at least one of the cured resin layers contains a matting agent.

6. The recording material of claim 4 wherein said toner receptive layer contains an antistatic agent.

7. The recording material of claim 4 wherein said cured resin layers are formed by free radical polymerization.

8. The recording material of claim 4 wherein said photopolymerization initiator is 2–10% by weight of solid matter in said curable mixture.

\* \* \* \* \*